United States Patent
Wu et al.

(10) Patent No.: US 8,266,469 B2
(45) Date of Patent: Sep. 11, 2012

(54) CLOCK CONTROLLING APPARATUS OF COMPUTER SYSTEM AND APPLICATIONS THEREOF

(75) Inventors: Chao-Chung Wu, Taipei (TW); Zen-Mao Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 388 days.

(21) Appl. No.: 12/475,818

(22) Filed: Jun. 1, 2009

(65) Prior Publication Data

US 2009/0319820 A1 Dec. 24, 2009

(30) Foreign Application Priority Data

Jun. 20, 2008 (TW) .............................. 97123070 A

(51) Int. Cl.
*G06F 1/04* (2006.01)
(52) U.S. Cl. .......................... 713/600; 713/500; 713/320
(58) Field of Classification Search .......... 713/320–344, 713/500–600
See application file for complete search history.

(56) References Cited

U.S. PATENT DOCUMENTS 6,175,929 B1 * 1/2001 Hsu et al. ...................... 713/500
7,370,221 B2 * 5/2008 Tang et al. .................... 713/501

FOREIGN PATENT DOCUMENTS

| CN | 1372189 A | 10/2002 |
| CN | 1588273 A | 3/2005 |
| CN | 201017306 Y | 2/2008 |
| TW | 498985 | 8/2002 |
| TW | 570219 | 1/2004 |

* cited by examiner

*Primary Examiner* — Brian Misiura
*Assistant Examiner* — Kim Huynh
(74) *Attorney, Agent, or Firm* — Jianq Chyun IP Office

(57) ABSTRACT

A clock controlling apparatus of a computer system used to tuning a clock frequency of a specific electronic device disposed on a motherboard and the application thereof are disclosed, wherein the clock controlling apparatus comprises an input control unit used to output a frequency increasing signal or a frequency decreasing signal, a control circuit connected to a clock generator disposed on the motherboard in order to tune the clock frequency of the electronic device according to the frequency increasing signal or the frequency decreasing signal, and a displaying unit connected to the control circuit in order to show the clock frequency.

16 Claims, 2 Drawing Sheets

CLOCK CONTROLLING APPARATUS OF COMPUTER SYSTEM AND APPLICATIONS THEREOF

FIELD OF THE INVENTION

The present invention relates to a computer system, and more particularly to a clock controlling apparatus of the computer system.

BACKGROUND OF THE INVENTION

Nowadays, motherboard-manufacturers have allowed their users to tune the clock frequency of the computer components that are disposed on their computer's motherboard, so as to make their computer attaining optimum performance, and this well known process is denominated as "overclocking". In general the clock frequency of the electronic components is conventionally tuned by altering the basic input/output system (BIOS) parameters of the user's computer. After the BIOS parameters of specific electronic components, such as the parameter setting of a central processing unit (CPU), a front side bus (FSB) and a memory of the computer, are altered and saved, the computer must be reset to renew the BIOS parameters. Such that the computer system could control the clock generator to make these electronic components running in desired clock frequency in accordance with the renewed BIOS parameters.

Nevertheless, the optimum performance of the computer system still cannot be achieved merely by one single overclocking process, and it is necessary to repeat the preceding approach to help the computer to gain the optimum BIOS parameters. Thus various BIOS parameter settings could be tried repeatedly and the computer system must be reset on and on until the optimum clock frequency of this electronic components are obtained. However, this approach is a time wasting and inefficient way to overclock the computer system.

To resolve the aforementioned drawbacks, the motherboard manufactures further provide a frequency adjusting program to help the user overclocking a computer system more conveniently. Under the same operating system, the user can execute the frequency adjusting program to directly tuning the clock frequency of the electronic components. In this context the clock frequency of the electronic components can be directed tuned by the frequency adjusting program in accordance with the users' requirement without repeatedly resetting the computer system during the overclocking process.

However, it is obvious that the frequency adjusting program may interfere with the computer's normal operation. When the frequency adjusting program is executed, the performance of the computer system may be inevitably inferior. Besides, it can not be sure that whether the clock frequency of the electronic components tuned by the frequency adjusting program can make the computer system running in the optimum performance. Thus a benchmark program must be further employed to evaluate the system performance of the computer system, wherein a system performance data should be generated by the benchmark program serving as evaluating scale.

Furthermore, since the performance of the frequency adjusting program and the benchmark program may interfere with each other, thus both of the frequency adjusting program and the benchmark program can not be executed simultaneously, or the system performance data and the accuracy of the system performance evaluation can deviate. Therefore, if the frequency adjusting program can not provide the electronic components the optimum clock frequency immediately, otherwise the user has to execute the frequency adjusting program and the benchmark program repeatedly and staggeringly until the optimum performance of the computer system is attained. Likewise, this still is a complicated and inefficient approach.

SUMMARY OF THE INVENTION

One aspect of the present invention, a clock controlling apparatus of a computer system is disclosed used to tune a clock frequency of a specific electronic device disposed on a motherboard the computer system. The clock controlling apparatus comprises an input control unit used to output a frequency increasing signal or a frequency decreasing signal, a control circuit connected to a clock generator disposed on the motherboard in order to tune the clock frequency of the electronic device according to the frequency increasing signal or the frequency decreasing signal, and a displaying unit connected to the control circuit in order to show the clock frequency.

Another aspect of the present invention, a computer system with a tunable clock frequency is disclosed. The computer system comprises a motherboard, an input control unit, a control circuit and a displaying unit, wherein the motherboard includes a specific electronic device and a clock generator used to provide a clock frequency to the electronic device; the input control unit is used to output a frequency increasing signal or a frequency decreasing signal; the control circuit connected to the clock generator is used to tune the clock frequency of the specific device according to the frequency increasing signal or the frequency decreasing signal; and the displaying unit connected to the control circuit is used to show the clock frequency.

In accordance with the embodiments of the present invention, the clock frequency of electronic components disposed on a computer system can be tuned by a clock controlling apparatus which is thoroughly benefited from a full hardware implementation. Accordingly, the benchmark program can be simultaneously executed to evaluate the performance of the computer system without any other interference, and the optimum performance of the computer system can be quickly obtained by the clock frequency tuning process of the present invention.

The above objects and advantages of the present invention will become more readily apparent to those ordinarily skilled in the art after reviewing the following detailed description and the accompanying drawings. However, it must be appreciated that these embodies and drawings are illustrative is not intended to limit the scope of the present invention.

BRIEF DESCRIPTION OF THE DRAWINGS

The accompanying drawings can be reviewed as following, in which.

DETAILED DESCRIPTION OF PREFERRED EMBODIMENTS

Figure 1:
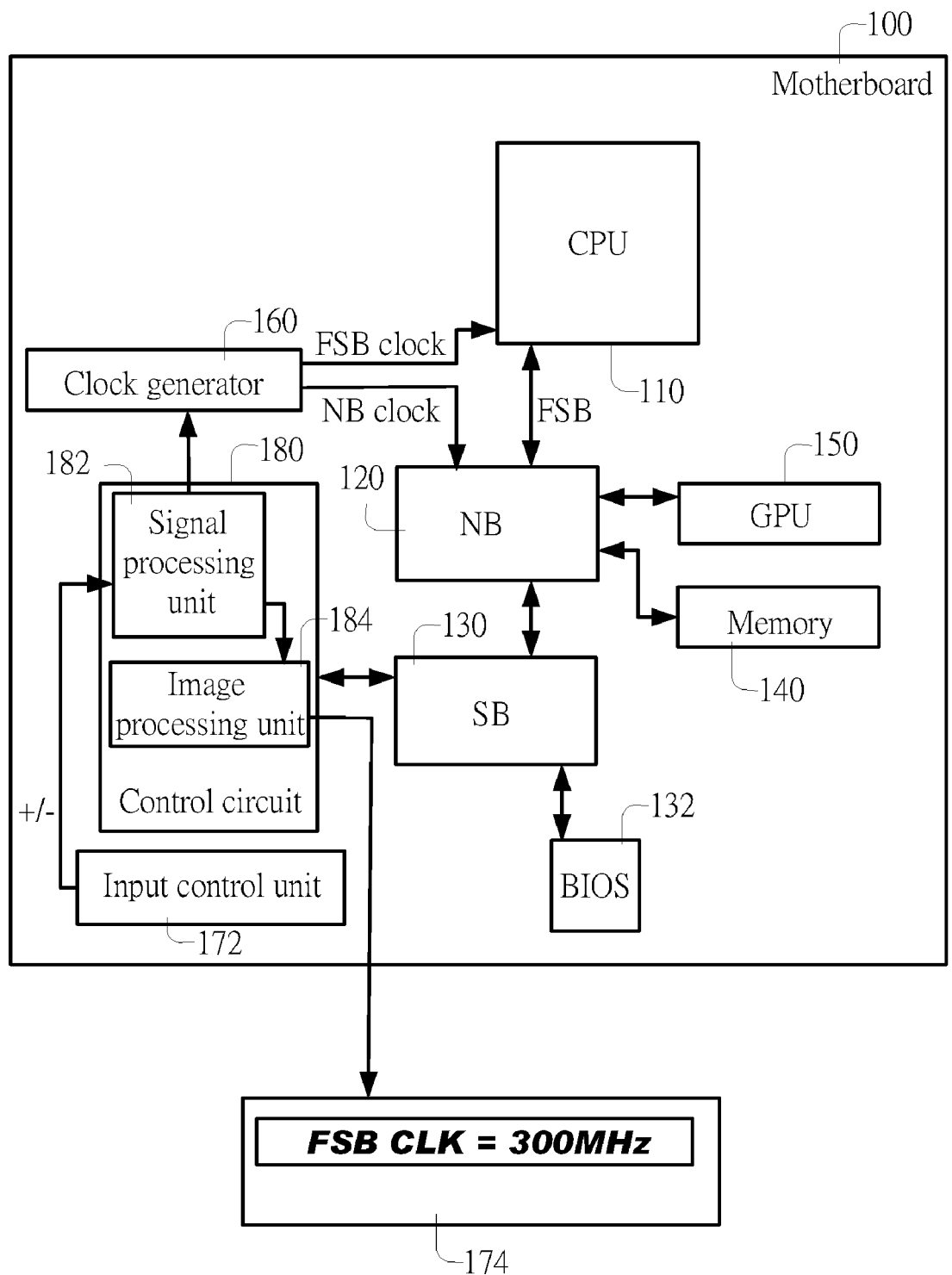
FIG. 1 illustrates a clock controlling apparatus of a computer system in accordance with the first embodiment of the present invention.

Referring to FIG. 1, FIG. 1 illustrates a clock controlling apparatus of a computer system in accordance with the first embodiment of the present invention, which is used to control the clock frequency of specific electronic devices, such as the CPU, front side buses (FSB) or memories disposed on the motherboard 100 of the computer system. In some embodiments of the present invention, the motherboard 100 comprises a CPU 110, a north bridge (NB) 120, a south bridge (SB) 130, a memory 140, a graphic processing unit (GPU) 150, a clock generator 160 and a BIOS 132. The NB 120 is connected to the CPU 110, the SB 130, the memory 140 and the GPU 150; and the BIOS 132 is connected to the SB 130. The clock generator 160 is used to generate several clock frequencies for these electronic devices, e.g. the clock generator 160 may generate a FSB clock frequency for the CPU 110 or generate a NB clock frequency for the NB 120.

Though the present description merely provides the embodiment of tuning the FSB clock frequency, however, it must be appreciated that the present embodiment is only illustrative; the clock controlling apparatus of present invention still can be applied to tune the clock frequency of other electronic devices.

The clock controlling apparatus comprises an input control unit 172, a control circuit 180 and a displaying unit 174, wherein the control circuit 180 is respectively connected to a standby voltage source of the computer system, the SB 130, the clock generator 160, the input control unit 172 and the displaying unit 174, wherein the control circuit 180 is connected to the SB 130 and the clock generator 160 respectively via a system management (SM) bus.

In the present embodiment, the control circuit 180 further comprises a signal processing unit 182 and an image processing unit 184; the input control unit 172 is a control stick fixed on the motherboard, and the displaying unit 174 is a small scale display device. Though the control circuit 180 of the present embodiment is disposed apart from the motherboard 100, in other embodiments the control circuit 180 may otherwise integrated on the motherboard 100.

The input control unit 172 is used to output a frequency increasing signal (+) or a frequency decreasing signal (−) to the signal processing unit 182 according to the requirement of the users, such that the signal processing unit 182 can control the clock generator 160 to tune the clock frequency of the electronic devices with an increase level ($\Delta f1$) or a decrease level ($\Delta f2$) according to the frequency increasing signal (+) or the frequency decreasing signal (−). For example, when the user pull the control stick towards right, a frequency increasing signal (+) is generated; on the other hand, when the control stick is pull towards left, a frequency decreasing signal (−) is then provided. Reducing to the practical embodiments, if the FSB clock of the computer system is 266 MHz and the increase level ($\Delta f1$) and the decrease level ($\Delta f2$) are both 3.3 MHz, the FSB clock of the computer system may be tuned to 266+10×(3.3)=300 MHz, when the user continuously provides 10 frequency increasing signal (+); and the FSB clock of the computer system may be tuned to 300−10×(3.3)=266 MHz again, when the user further provides 10 frequency decreasing signal (−) continuously.

When a user utilizes the control circuit 180 to tune the clock frequency of the FSB, the signal processing unit 182 can renew the parameters of the BIOS 132 according to the tuned clock frequency of the FSB through the SB 130. Thus, the parameters of the FSB clock set in the BIOS 132 can synchronize with the clock frequency of the FSB tuned by the control circuit 180; meanwhile the clock frequency of the FSB can be shown on the displaying unit 174 by the image processing unit 184 of the control circuit 180. Therefore, the process of tuning the FSB clock can be accomplished without utilizing any software that may interfere with the performance of the computer system, and the user can simultaneously realize the current clock frequency of the FSB from the displaying unit 174.

Accordingly, when the benchmark program is employed, all the user should do is to control the input control unit 172 to vary the frequency increasing signal (+) or the frequency decreasing signal (−) according to the system performance data generated by the benchmark program to attain the optimum system performance of the computer.

Besides, since the control circuit 180 is directly connected to the standby voltage source, thus even if the computer system was off the control circuit 180 can still be operated to tune the clock frequency of the FSB. By virtue of the preceding fact that the parameters of the FSB clock set in the BIOS 132 can be synchronously altered in accordance with the clock frequency of the FSB tuned by the control circuit 180, thus the clock frequency of the FSB can be tuned by the input control unit 172 and the setting of the BIOS 132 can be simultaneously renewed by the clock controlling apparatus of the present invention prior the computer system is restarted, and when the computer system is turn on the parameters of the FSB clock set in the BIOS 132 has been already altered according to the user's requirements.

Figure 2:
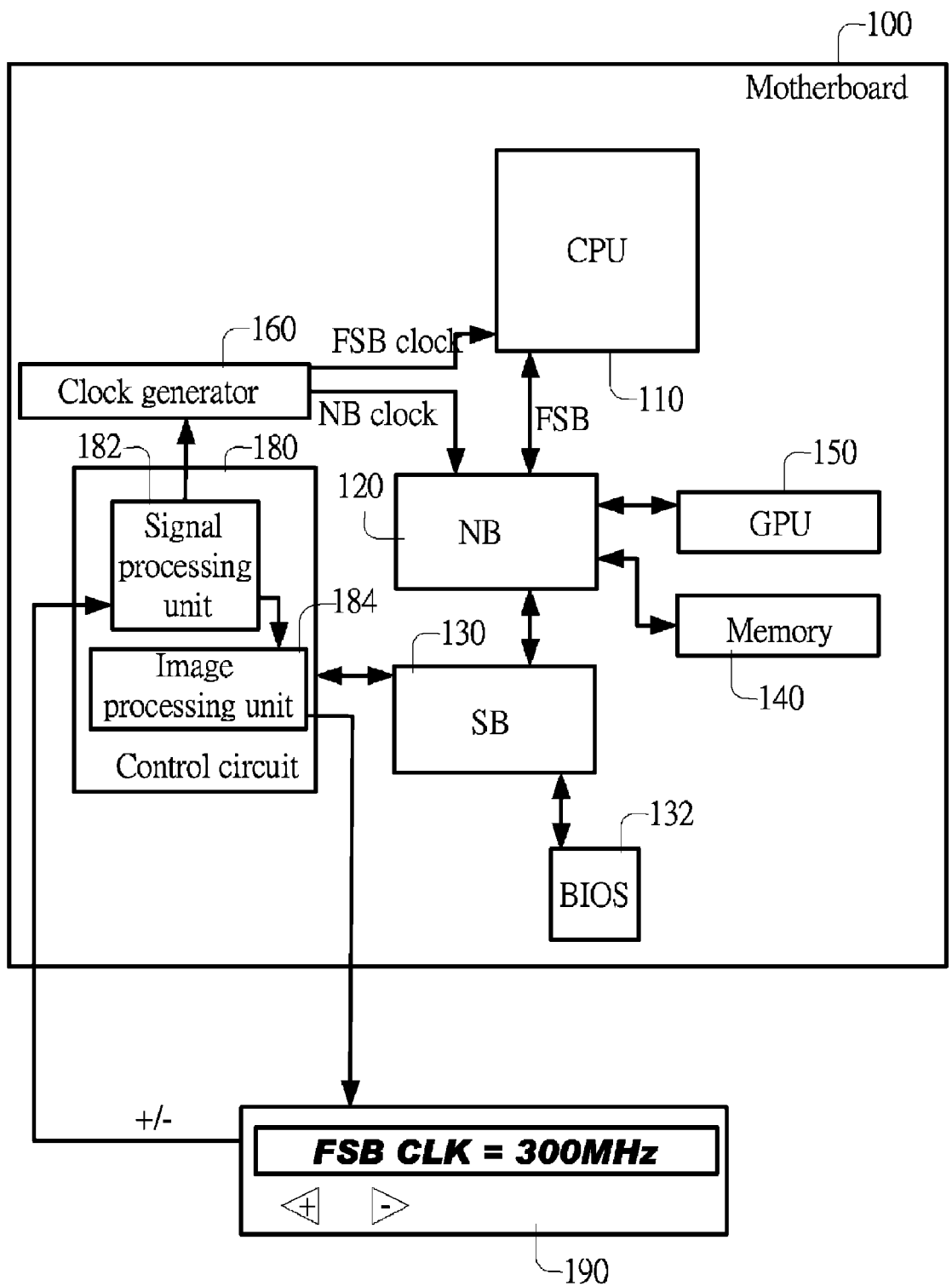
FIG. 2 illustrates a clock controlling apparatus of a computer system in accordance with the second embodiment of the present invention.

FIG. 2 illustrates a clock controlling apparatus of a computer system in accordance with the second embodiment of the present invention. The difference distinguished between the first and the second embodiments is that the input control unit of the second embodiment is disposed on an external displaying unit 190 rather than disposed on the motherboard 100 of the computer system. In the second embodiment, the external displaying unit 190 has a frequency increasing button and a frequency decreasing button that are respectively used to (compressed in order to) output a frequency increasing signal (+) or a frequency decreasing signal (−) to the signal processing unit 182, such that the signal processing unit 182 can control the clock generator 160 to tune the clock frequency of the electronic devices with an increase level ($\Delta f1$) or a decrease level ($\Delta f2$) according to the frequency increasing signal (+) or the frequency decreasing signal (−). The control circuit 180 further comprises an image processing unit 184 used to show the clock frequency of the FSB on the external displaying unit 190.

In accordance with the preceding embodiments, the advantages of the present invention is that the clock frequency tuning process can be accomplished thoroughly by a clock controlling apparatus which is thoroughly benefited from a full hardware implementation rather than by the manual alteration of the BIOS parameters. Accordingly, the benchmark program can be simultaneously executed to evaluate the performance of the computer system without any other interference, thus the optimum performance and clock frequency of the computer system can be quickly obtained by the clock frequency tuning process of the present invention.

As is understood by a person skilled in the art, it is intended to cover various modifications and similar arrangements included within the spirit and scope of the appended claims, the scope of which should be accorded the broadest interpretation so as to encompass all such modifications and similar structure.

What is claimed is:

1. A clock controlling apparatus of a computer system used to tune a clock frequency of an electronic device disposed on a motherboard, comprising:

an input control unit, used to output a frequency increasing signal or a frequency decreasing signal;

a control circuit, connected to a clock generator disposed on the motherboard in order to tune the clock frequency of the electronic device according to the frequency increasing signal or the frequency decreasing signal, and the control circuit is directly connected to a standby voltage source to enable tuning of the clock frequency even if the computer system is turned off; and a displaying unit, connected to the control circuit in order to show the clock frequency.

2. The clock controlling apparatus according to claim 1, wherein the control circuit comprises:

a signal processing unit, used to receive the frequency increasing signal or the frequency decreasing signal and to control the clock generator to output the clock frequency; and an image processing unit, connected to the signal processing unit and the displaying unit.

3. The clock controlling apparatus according to claim 1, wherein the input control unit is a control stick, when the control stick is driven towards a first direction, the frequency increasing signal is generated, and when the control stick is driven towards a second direction, the frequency decreasing signal is generated.

4. The clock controlling apparatus according to claim 1, wherein the input control unit comprises a frequency increasing button and a frequency decreasing button, when the frequency increasing button is compressed, the frequency increasing signal is generated, and when the frequency decreasing button is compressed, the frequency decreasing signal is generated.

5. The clock controlling apparatus according to claim 1, wherein the electronic device comprises a central processing unit (CPU), a front side buses (FSB) or a memory.

6. The clock controlling apparatus according to claim 1, wherein the input control unit comprises a frequency increasing button and a frequency decreasing button, and the input control unit is disposed on the displaying unit.

7. The clock controlling apparatus according to claim 1, wherein the input control unit renews a parameter setting of a basic input/output system (BIOS) disposed on the mother board according to the tuned clock frequency.

8. The clock controlling apparatus according to claim 1, wherein the displaying unit is outside the motherboard.

9. A computer system with a tunable clock frequency, comprising:

a motherboard, including an electronic device and a clock generator that is used to provide a clock frequency to the electronic device;

an input control unit, used to output a frequency increasing signal or a frequency decreasing signal;

a control circuit, connected to the clock generator in order to tune the clock frequency according to the frequency increasing signal or the frequency decreasing signal, and the control circuit is directly connected to a standby voltage source to enable tuning of the clock frequency even if the computer system is turned off; and a displaying unit, connected to the control circuit in order to show the clock frequency.

10. The computer system according to claim 9, wherein the control circuit comprises:

a signal processing unit, used to receive the frequency increasing signal or the frequency decreasing signal and to control the clock generator to output the clock frequency; and an image processing unit, connected to the signal processing unit and the displaying unit in order to show the clock frequency.

11. The computer system according to claim 9, wherein the input control unit is a control stick, when the control stick is driven towards a first direction, the frequency increasing signal is generated, and when the control stick is driven towards a second direction, the frequency decreasing signal is generated.

12. The computer system according to claim 9, wherein the input control unit comprises a frequency increasing button and a frequency decreasing button, when the frequency increasing button is compressed, the frequency increasing signal is generated, and when the frequency decreasing button is compressed, the frequency decreasing signal is generated.

13. The computer system according to claim 9, wherein the electronic device comprises a CPU, a FSB or a memory.

14. The computer system according to claim 9, wherein the input control unit comprises a frequency increasing button and a frequency decreasing button, and the input control unit is disposed on the displaying unit.

15. The computer system according to claim 9, further comprising a BIOS disposed on the mother board, and the input control unit renews a parameter setting of the BIOS according to the tuned clock frequency.

16. The computer system according to claim 9, wherein the displaying unit is outside the motherboard.

* * * * *